(12) United States Patent
Kamakura

(10) Patent No.: US 12,339,704 B2
(45) Date of Patent: Jun. 24, 2025

(54) HEAD-MOUNTED DISPLAY APPARATUS

(71) Applicant: SEIKO EPSON CORPORATION, Tokyo (JP)

(72) Inventor: Kazuya Kamakura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 176 days.

(21) Appl. No.: 18/156,394

(22) Filed: Jan. 19, 2023

(65) Prior Publication Data

US 2023/0236428 A1 Jul. 27, 2023

(30) Foreign Application Priority Data

Jan. 27, 2022 (JP) ................................. 2022-010741

(51) Int. Cl.
*G02B 27/01* (2006.01)
*G06F 1/16* (2006.01)

(52) U.S. Cl.
CPC ......... *G06F 1/163* (2013.01); *G02B 27/0176* (2013.01); *G02B 2027/0169* (2013.01); *G02B 2027/0178* (2013.01)

(58) Field of Classification Search
CPC ......... G06F 1/163; G02B 7/002; G02B 27/01; G02B 27/02; G02B 27/0149; G02B 27/017; G02B 27/0176

See application file for complete search history.

(56) References Cited

U.S. PATENT DOCUMENTS

| | | | | |
|---|---|---|---|---|
| 9,207,456 B2* | 12/2015 | Hiraide | ............. | G02B 27/0176 |
| 9,465,217 B2* | 10/2016 | Hiraide | ............. | G02B 27/0172 |
| 10,718,950 B2* | 7/2020 | Kamakura | ......... | G02B 27/0172 |
| 10,788,686 B2* | 9/2020 | Tsai | ........................ | G02C 7/10 |
| 10,935,184 B2* | 3/2021 | Shanley, IV | ....... | G02B 27/0176 |
| 11,719,946 B2* | 8/2023 | Ejiri | ......................... | G02C 9/04 |
| | | | | 351/155 |

FOREIGN PATENT DOCUMENTS

| | | | |
|---|---|---|---|
| JP | 2018082371 | | 5/2018 |
| KR | 20230077453 A | * | 6/2023 |
| WO | WO-2017010276 A1 | * | 1/2017 ............... A45F 5/00 |

* cited by examiner

*Primary Examiner* — Nidhi Thaker
(74) *Attorney, Agent, or Firm* — JCIPRNET

(57) ABSTRACT

A head-mounted display apparatus includes a support member that supports a first display unit and a second display unit that display images, an extension member extending in a second direction intersecting a first direction along a direction from the first display unit to the second display unit, and a coupling member coupling the support member to the extension member, in which the support member has a first coupled portion coupled to the extension member, the extension member has a second coupled portion coupled to the support member, and a thickness (width) of the first coupled portion is thicker (wider) than a thickness (width) of the second coupled portion in a third direction intersecting the first direction and the second direction.

11 Claims, 9 Drawing Sheets

HEAD-MOUNTED DISPLAY APPARATUS

The present application is based on, and claims priority from JP Application Serial Number 2022-010741, filed Jan. 27, 2022, the disclosure of which is hereby incorporated by reference herein in its entirety.

BACKGROUND

1. Technical Field

This disclosure relates to a head-mounted display apparatus configured to display an image when being worn on the head of a user.

2. Related Art

As a head-mounted display (hereinafter, also referred to as an "HMD"), which is one mode of a head-mounted display apparatus, one that regulate a position of the HMD with respect to eyeglasses by an elastic support unit 30 being placed on the upper surface of the temple of the eyeglasses is known (JP-A-2018-82371).

However, according to the technique exemplified in JP-A-2018-82371, for example, when the temples of the eyeglasses are thin or the like, it is difficult to place the support unit 30 on the upper surface of the temples of the eyeglasses, and thus there is concern that a position of the HMD with respect to the eyeglasses will not be accurately regulated.

SUMMARY

A head-mounted display apparatus according to one aspect of this disclosure includes a first display unit that displays an image, a second display unit that displays an image, a support member that supports the first display unit and the second display unit, an extension member extending in a second direction intersecting a first direction along the direction from the first display unit to the second display unit, and a coupling member coupling the support member to the extension member, in which the support member has a first coupled portion coupled to the extension member via the coupling member, the extension member has a second coupled portion coupled to the support member via the coupling member, and a width of the first coupled portion is wider than a width of the second coupled portion in a third direction intersecting the first direction and the second direction.

DESCRIPTION OF EXEMPLARY EMBODIMENTS

First Embodiment

An example of a head-mounted display apparatus according to a first embodiment will be described with reference to FIGS. 1 to 4, and the like below. A head-mounted display apparatus 100 illustrated in FIG. 1 and the like is a head-mounted display (hereinafter, also referred to as an "HMD"), which is an image display apparatus that enables an observer or a user US wearing the apparatus to recognize an image as a virtual image. For example, in FIG. 1 and the like illustrating appearance perspective views of the head-mounted display apparatus 100, D1, D2, and D3 constitute each of orthogonal coordinate systems, and a +D1 direction corresponds to a lateral direction along the direction in which both eyes of an observer or a user US (see FIG. 2 and the like) wearing the head-mounted display apparatus 100 or the HMD are aligned or the direction in which a first display unit 100A and a second display unit 100B, which will be described later, are aligned. In addition, a +D2 direction corresponds to a backward direction or a forward direction with respect to the user US, and a +D3 direction corresponds to a longitudinal direction (downward direction) orthogonal to the lateral direction in which both eyes of the user US are aligned. A +D3 direction is parallel to a vertical axis or a vertical direction. Furthermore, with respect to the above description, the +D1 direction is assumed as a first direction, the +D2 direction is assumed as a second direction, and the +D3 direction is assumed as a third direction.

Figure 1:
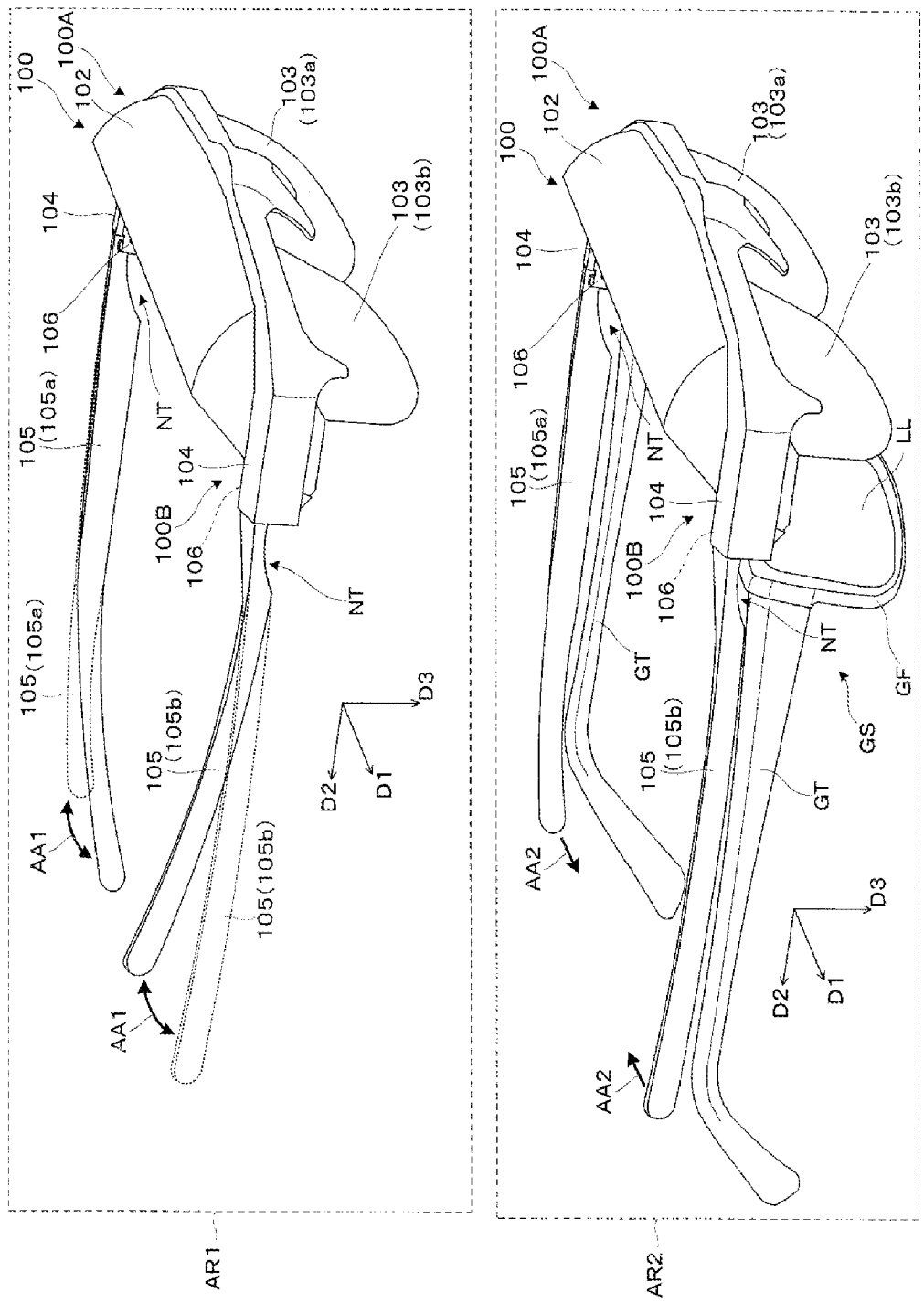
FIG. 1 is appearance perspective views for describing a head-mounted display apparatus according to a first embodiment.
Figure 2:
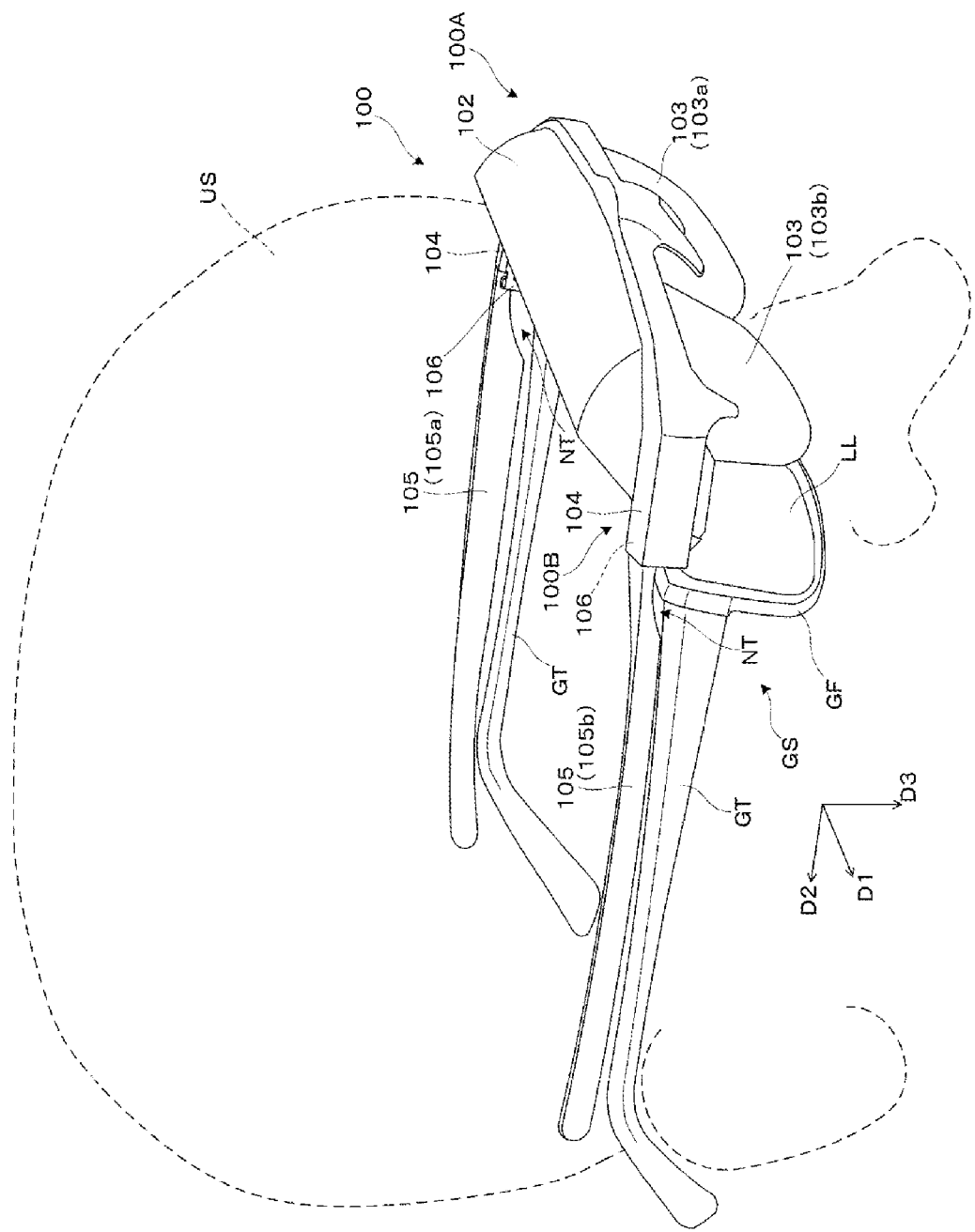
FIG. 2 is an appearance perspective view illustrating an example of a state in which the head-mounted display apparatus is worn over eyeglasses.
Figure 3:
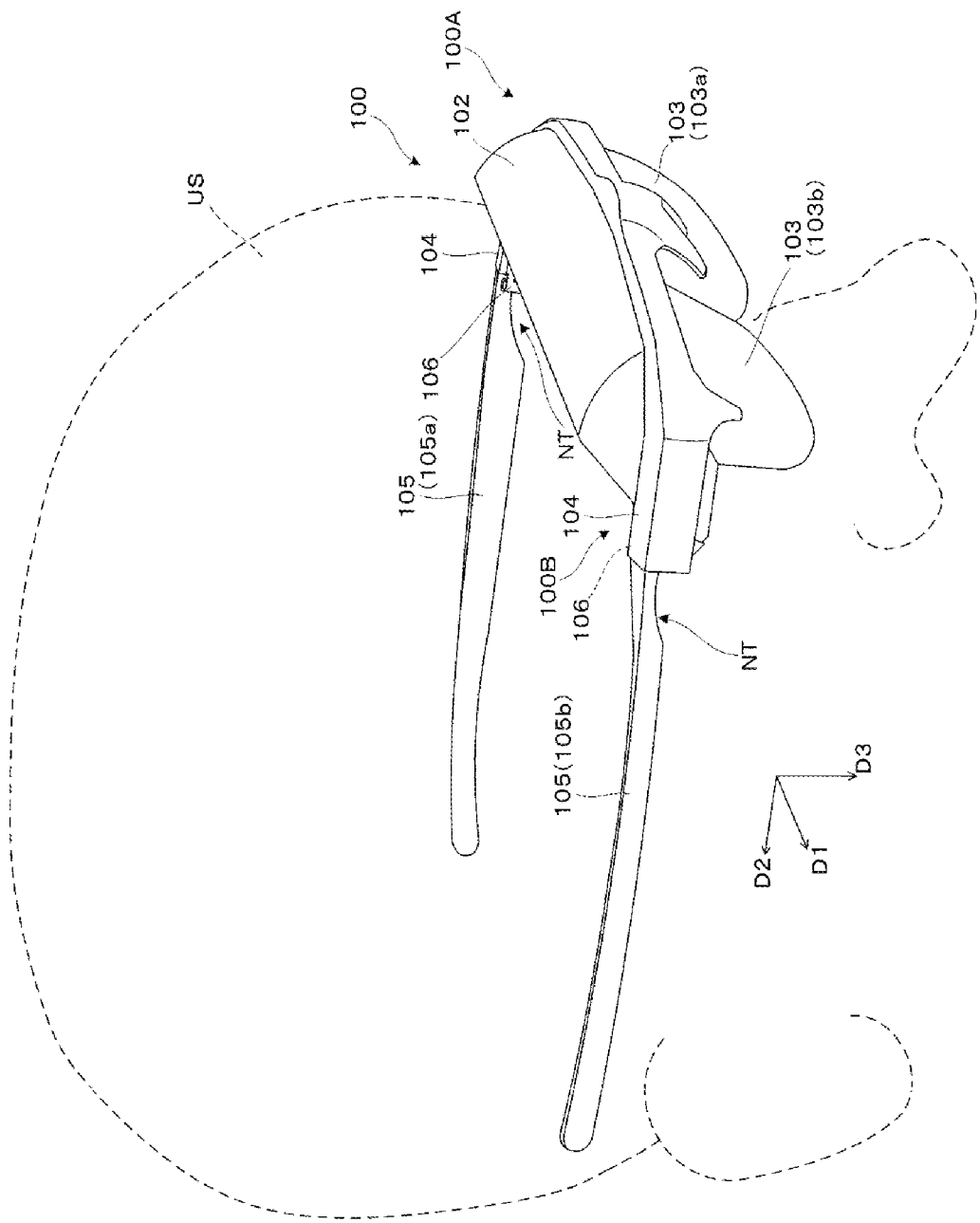
FIG. 3 is an appearance perspective view illustrating an example of a state in which the head-mounted display apparatus is being worn.

In FIG. 1, whereas the state AR1 indicates a state in which only the head-mounted display apparatus 100 is present, the state AR2 indicates a state in which the head-mounted display apparatus 100 is mounted over eyeglasses GS. In this way, the head-mounted display apparatus 100 can be used while it is placed over the eyeglasses GS. FIG. 2 illustrates a state in which the user US wearing the eyeglasses GS is wearing the head-mounted display apparatus 100. Further, the user US may wear the head-mounted display apparatus 100 without wearing the eyeglasses GS (see FIG. 2) as illustrated in FIG. 3.

Hereinafter, a configuration example of the head-mounted display apparatus 100 will be described in detail. First, for example, the head-mounted display apparatus 100 includes a display drive unit 102, a combiner 103, a support member 104, an extension member 105, and a coupling member 106 as illustrated in the state AR1 in FIG. 1.

The display drive unit 102 is an optical device including a display element configured by, for example, an organic electro-luminescence (organic EL) display, and an optical system such as a projection lens and a prism for projecting a still image or a moving image formed on the display element, and forms image light for helping the left and right eyes of the user US perceive an image. In the illustrated example, a pair of left and right optical devices are linked and integrated to form the display drive unit 102 extending in the D1 direction. In addition, in the illustrated example, the display drive unit 102 is disposed on the −D3 side of the support member 104 (the negative side of the third direction), that is, on the side thereabove.

The combiner 103 has a shape formed by cutting the upper portion of a half-sphere protruding forward, that is, in the −D2 direction, and is disposed to protrude to the +D3 side of the support member 104 (the positive side of the third direction), that is, downward. The combiner 103 is constituted by a transparent see-through mirror, and for example, reflects part of image light GL from the display drive unit 102 and transmits part of external light OL, as illustrated in the state BR1 of FIG. 4. With this configuration, the user US wearing the head-mounted display apparatus 100 can observe a virtual image formed with the image light GL and overlapped on the outside image. Further, in this case, the image light GL is guided as a whole in the upward-downward direction, that is, in the D3 direction (light guiding in the longitudinal direction). In addition, the combiner 103 is configured as a pair for the left eye and the right eye in the example illustrated in FIG. 1 and the like. That is, a first combiner 103a for the left eye and a second combiner 103b for the right eye function as the combiner 103.

Here, the portion of the display drive unit 102 to form an image for the left eye and the first combiner 103a provided corresponding thereto are assumed as a first display unit 100A for displaying an image for the left eye. Likewise, the portion of the display drive unit 102 to form an image for the right eye and the second combiner 103b provided corresponding thereto are assumed as a second display unit 100B for displaying an image for the right eye. Further, in this case, the +D1 direction that is the first direction is a direction along the direction from the first display unit 100A toward the second display unit 100B.

In addition, since a component reflected by the combiner 103 eventually becomes an image that is visually recognized as a virtual image formed from the image light GL, with respect to the first display unit 100A and the second display unit 100B, only the first combiner 103a can be regarded as the first display unit 100A, and only the second combiner 103b can be regarded as the second display unit 100B.

The support member 104 is a frame-shaped member extending in the D1 direction and supporting or fixing the display drive unit 102 and the combiner 103 as described above. The support member 104 is formed of, for example, a magnesium alloy, a resin member, or the like. In addition, when viewed from the perspective of the relationship between the first display unit 100A and the second display unit 100B, the support member 104 supports the first display unit 100A and the second display unit 100B. For example, when only the first combiner 103a and the second combiner 103b are regarded as the first display unit 100A and the second display unit 100B, the support member 104 supports the first display unit 100A and the second display unit 100B on one side (positive side), that is, the downward side, of the third direction. In addition, the support member 104 is coupled to the extension member 105 when viewed in the second direction. Further, this point will be described later in detail with reference to FIG. 4.

The extension member 105 is a temple (stem)-shaped member extending in the +D2 direction (the second direction), which is a direction intersecting (orthogonal to) the +D1 direction (the first direction) when being used, and is constituted by a pair of a left-side first extension member 105a and a right-side second extension member 105b. Further, the extension member 105 is foldable at the coupling member 106 constituted by, for example, a hinge or the like when not being used, and it is assumed that the state of use specifies the direction in which the extension member 105 extends here. Thus, in this case, the extension member 105 is described as extending in the +D2 direction which is the backward direction from the user US, similarly to the temple GT of the eyeglasses GS (see the state AR2 or the like). Further, the tip side (the +D2 side or the positive side in the second direction) of the extension member 105 has flexibility as indicated by the bidirectional arrows AA1 in the state AR1, and is fixed by being clamped to the side of the head (temples) of the user US in the state illustrated in FIG. 2 or FIG. 3 due to a force to return in the direction indicated by the arrows AA2 when being used as illustrated in the state AR2.

In particular, in this embodiment, the extension member 105 extending from the support member 104 includes notches NT on the side on which the combiner 103 as a display unit is supported, that is, the +D3 side (lower side), which is the −D2 side that is a side closer to the support member 104, that is, the side on which the extension member 105 is coupled to the support member 104. The notches NT extend in the D2 direction, which is the direction in which the extension member 105 extends, and form a sufficient space for receiving a lens frame GF of the eyeglasses GS as illustrated in the state AR2 and FIG. 2. If the point of view is changed, a space for avoiding the eyeglasses GS when the user US puts on or takes off the head-mounted display apparatus 100 from above is secured while the user US (see FIG. 2 and the like) is wearing the eyeglasses GS.

The coupling member 106 is a member coupling the support member 104 and the extension member 105, and for example, includes a hinge or the like as described above, coupling the end of the support member 104 on the extension member 105 side (+D2 side) to the end of the extension member 105 on the support member 104 side (−D2 side).

Figure 4:
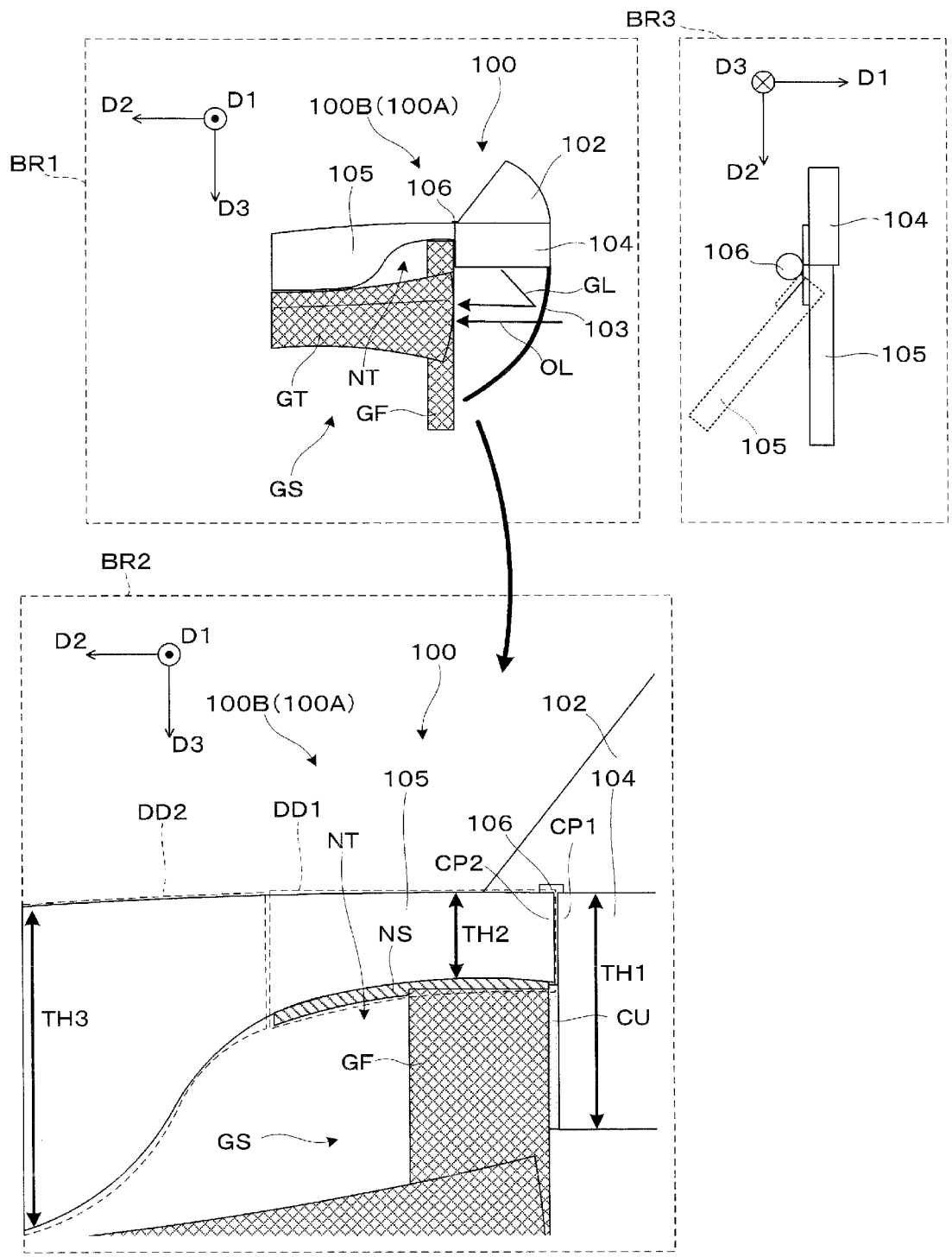
FIG. 4 includes conceptual views of the head-mounted display apparatus.

The coupling points of the support member 104 and the extension member 105 and one mode of attachment of the eyeglasses GS to the coupling points and the surroundings will be described below with reference to FIG. 4. In FIG. 4, the state BR1 shows a side view conceptually illustrating a coupling point and the surroundings of the head-mounted display apparatus 100, and the state BR2 shows a partially enlarged view thereof. In addition, the state BR3 shows a plan view conceptually illustrating the appearance of coupling of the support member 104, the extension member 105, and the coupling member 106.

For example, as shown in the state BR2, the support member 104 has a first coupled portion CP1 as an end on the +D2 side on which the support member 104 is coupled to the extension member 105 by the coupling member 106. That is, the first coupled portion CP1 is a portion of the support member 104 coupled to the extension member 105 via the coupling member 106.

On the other hand, the extension member 105 has a second coupled portion CP2 as an end on the −D2 side on which the extension member 105 is coupled to the support member 104 by the coupling member 106. That is, the second coupled portion CP2 is a portion of the extension member 105 coupled to the support member 104 via the coupling member 106.

Further, although the coupling member 106 may have various modes in configuration, for example, it may be configured with a hinge-shaped member and thus the extension member 105 can be rotatably coupled to the support member 104 illustrated in the state BR3. In other words, the extension member 105 is capable of rotating (rotatable) at the coupling member 106 using the D3 direction, which is the third direction, as the axial direction of the rotational axis.

In addition, here, the second coupled portion CP2 is thinner than the first coupled portion CP1 in the D3 direction (third direction). That is, when the first coupled portion CP1 and the second coupled portion CP2 are compared for the thicknesses (widths) in the D3 direction, the thickness (width) TH1 of the first coupled portion CP1 is thicker (wider) than the thickness (width) TH2 of the second coupled portion CP2. Furthermore, in the extension member 105, the second coupled portion CP2 is thinner (narrower) in the D3 direction (third direction) than the other portions. More specifically, when a range of the extension member 105 occupying one side thereof including the second coupled portion CP2 (on the −D2 side) is assumed as a first region DD1 and a range of the extension member 105 occupying the other side thereof not including the second coupled portion CP2 (on the +D2 side) is assumed as a second region DD2 as indicated by dashed lines in the drawing, the thickness (width) TH2 that is also a thickness (width) of the first region DD1 in the D3 direction is thinner (narrower) than the thickness (width) TH3 of the second region DD2 in the D3 direction.

In other words, since the head-mounted display apparatus 100 of this embodiment has the difference in thickness (width) in the D3 direction (third direction) as described above, the notches NT that enable the head-mounted display apparatus to be positioned (leaned) with respect to the eyeglasses GS (lens frame GF) while avoiding the eyeglasses GS when it is put on or taken off are formed.

In addition, a slip resistance member NS is provided on the surface of the second coupled portion CP2 of the extension member 105 in the first region DD1 on the lower side (+D3 side) in the illustrated example. In addition, a cushioning material CU is provided at a spot on a surface of the first coupled portion CP1 of the support member 104 on the +D2 side on which the support member is likely to be in contact with the eyeglasses GS. As illustrated, the head-mounted display apparatus 100 is positioned (leaned) with respect to the eyeglasses GS by bringing the eyeglasses GS in contact with the slip resistance member NS and the cushioning material CU. At this time, the slip resistance member NS curbs misalignment, and the cushioning material CU prevents a lens LL of the eyeglasses GS (see FIG. 2 and the like) from being damaged or the like.

Figure 5:
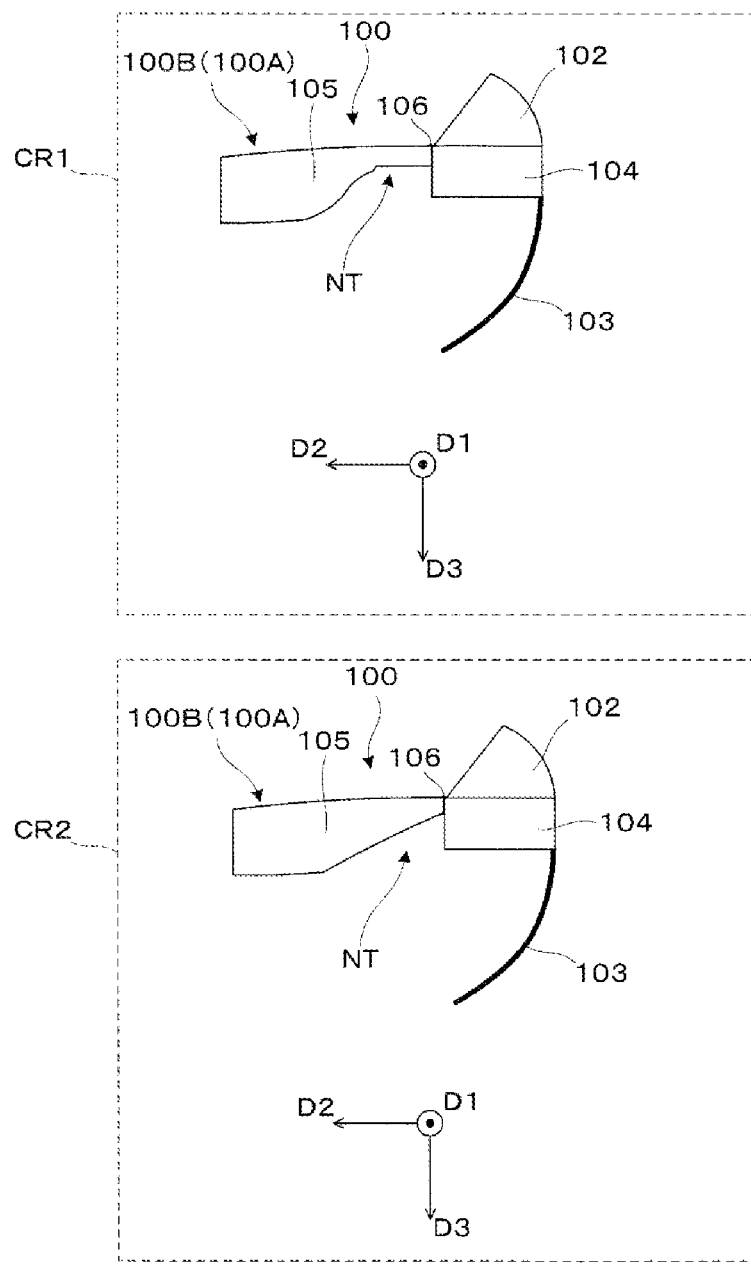
FIG. 5 includes views illustrating modified examples of the head-mounted display apparatus.

In addition, the notches NT can have a variety of shapes as illustrated in the state CR1 or the state CR2 in FIG. 5 as a modified example of the head-mounted display apparatus 100.

As described above, the head-mounted display apparatus 100 according to this embodiment includes the first display unit 100A that displays an image, the second display unit 100B that displays an image, the support member 104 that supports the first display unit 100A and the second display unit 100B, the extension member 105 extending in the D2 direction that is the second direction intersecting the D1 direction that is the first direction along the direction from the first display unit 100A to the second display unit 100B, and the coupling member 106 coupling the support member 104 to the extension member 105, in which the support member 104 has the first coupled portion CP1 coupled to the extension member 105 via the coupling member 106, the extension member 105 has the second coupled portion CP2 coupled to the support member 104 via the coupling member 106, and the thickness TH1 representing the width of the first coupled portion CP1 is thicker, that is, wider, than the thickness TH2 representing the width of the second coupled portion CP2 in the D3 direction that is the third direction intersecting the D1 direction and the D2 direction. By making a difference in the thicknesses (widths) TH1 and TH2 on the support member 104 side (first coupled portion CP1) supporting each of the display units 100A and 100B and on the extension member 105 side (second coupled portion CP2) in the head-mounted display apparatus 100, the head-mounted display apparatus can be easily and reliably positioned (leaned) with respect to the eyeglasses GS, and thus can be comfortably put on or taken off even when the eyeglasses GS are worn.

Second Embodiment

An example of a head-mounted display apparatus 100 according to a second embodiment will be described with reference to FIG. 6 and the like below.

Figure 6:
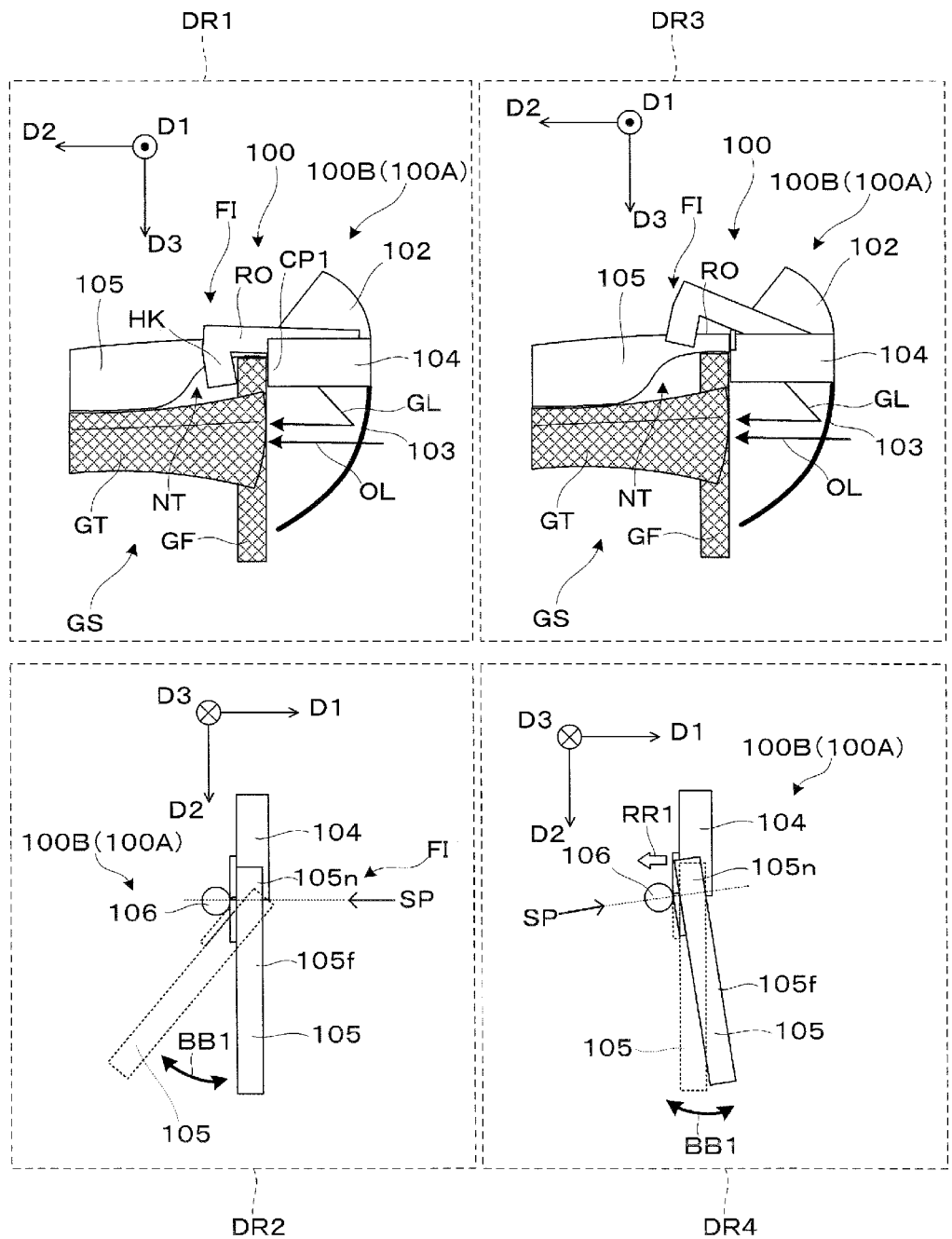
FIG. 6 includes conceptual views for describing a head-mounted display apparatus according to a second embodiment.

The head-mounted display apparatus 100 according to this embodiment differs from that of the first embodiment in that the head-mounted display apparatus 100 further includes a fixing member FI that fixes the eyeglasses GS or the lens frame GF of the eyeglasses GS as an object as illustrated in FIG. 6 and the like when the head-mounted display apparatus 100 is positioned (leaned) with respect to the eyeglasses GS. In addition, as an example, here, the fixing member FI cooperates with the support member 104 to fix the lens frame GF, and more specifically, the fixing (positioning) is performed by clamping the lens frame GF with the support member 104 and the fixing member FI. FIG. 6 includes views corresponding to a portion of FIG. 4, and the states DR1 and DR2 of FIG. 6 are conceptual side view and plan view illustrating a state in which the fixing member FI is at a first position and fixing (lock) by the fixing member FI has been made. The states DR3 and DR4 are conceptual side view and plan view illustrating a state in which the fixing member FI is at a second position and fixing (lock) by the fixing member FI has been released. Further, since the head-mounted display apparatus 100 of the second embodiment is similar to that of the first embodiment except that the fixing member FI is further provided, description of the entire overview of the head-mounted display apparatus 100 is omitted.

As can be seen by comparing the state DR1 with the state DR3 in FIG. 6, while a hook HK of a lock portion RO of the fixing member FI faces a part of the first coupled portion CP1 of the support member 104 when fixing the object, fixing (lock) is released when the hook HK is removed.

Although a variety of modes can be conceivable for a configuration of the fixing member FI as described above, in one example here, a case in which the extension member 105 is utilized for releasing fixing (lock) will be described. Further, the extension member 105 is assumed to be capable of rotating (rotatable) with respect to the support member 104 at the coupling member 106 using the D3 direction, which is the third direction, as the axial direction of the rotational axis as described above. In other words, the extension member 105 is rotatable in the direction indicated by the bidirectional arrows BB1 as shown in the states DR2 and DR4. Furthermore, here, the extension member 105 is assumed to further extend not only to the +D2 side but also to the support member 104 side (−D2 side) over the coupling member 106. In other words, in the state indicated by the solid line in the state DR2 (corresponding to the state of the extension member 105 at the arranged position in normal use), the extension member 105 is present not only on the +D2 side but also on the −D2 side in the D2 direction having the rotational center position of the coupling member 106 as the reference position SP. Here, the portion of the extension member 105 on the side close to the support member 104 (−D2 side) from the reference position SP is assumed as a first portion 105n, and the portion of the extension member 105 on the side far from the support member 104 (+D2 side) is assumed as a second portion 105f. Further, a length of the first portion 105n in the D2 direction is shorter than a length of the second portion 105f in the D2 direction as illustrated.

Moreover, the extension member 105 is assumed to be further rotatable in the direction indicated by the bidirectional arrow BB1 than in the state indicated by the solid line in the state DR2, as indicated by the solid line in the state DR4. In other words, it is assumed that the extension member 105 can be further spread, that is, the second portion 105f of the extension member 105 can be spread, outward (to the +D1 side). In this case, the first portion 105n of the extension member 105 moves further inward (to the −D1 side), relatively, that is, in the direction indicated by the arrow RR1.

By using the first portion 105n that moves as described above in this embodiment, a structure in which the lock portion RO flips is formed. That is, the fixing member FI is configured by cooperation of the first portion 105n, which is a part of the extension member 105, and the lock portion RO.

Figure 7:
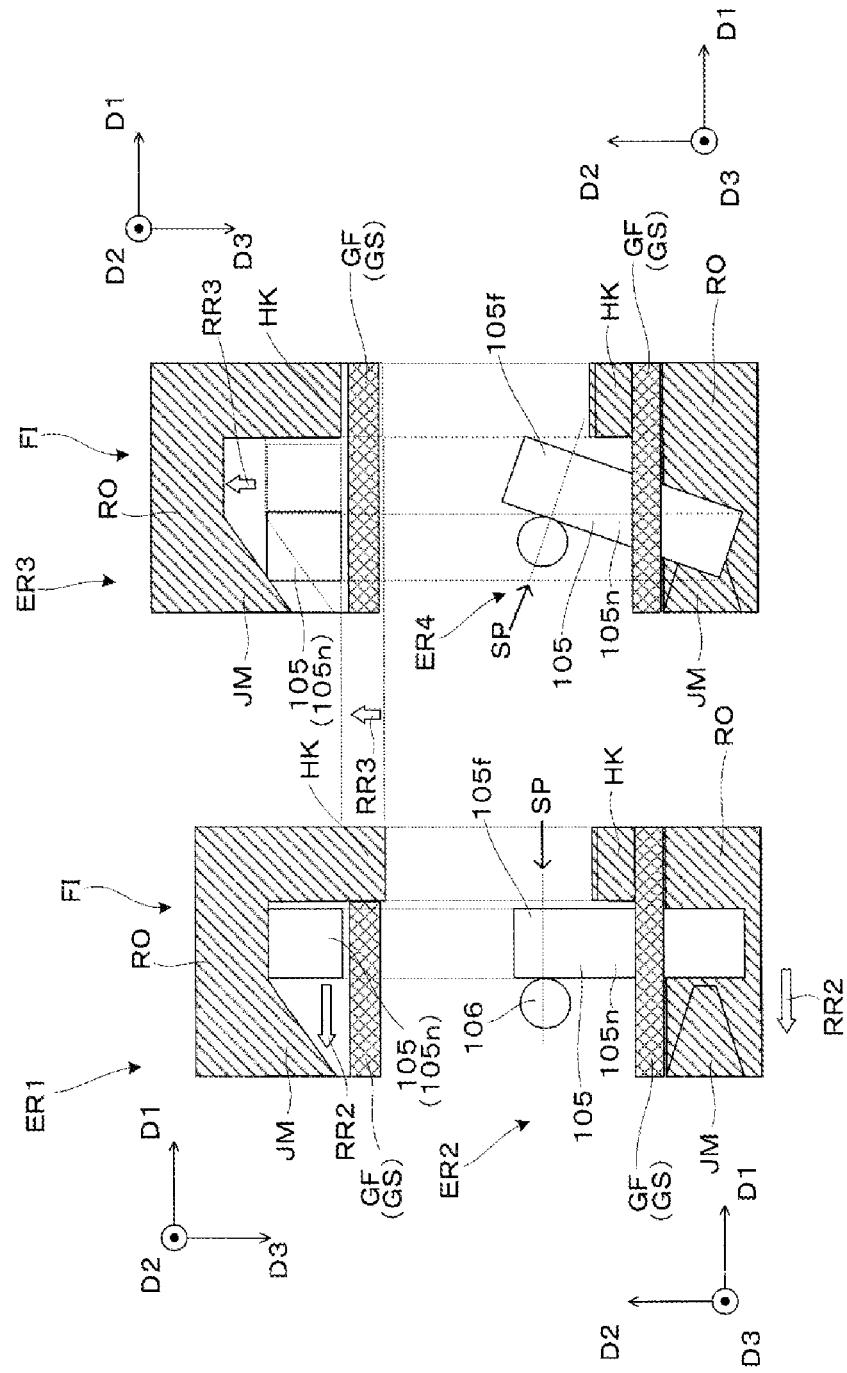
FIG. 7 includes conceptual views for describing a structure of a fixing member.

FIG. 7 is a conceptual diagram for describing an example of a structure of the fixing member FI as described above. In FIG. 7, the states ER1 and ER2 are conceptual back and bottom views illustrating a state in which the fixing member FI is at the first position and fixing (lock) by the fixing member FI has been performed. The states ER3 and ER4 are conceptual back and bottom views illustrating a state in which the fixing member FI is at the second position and fixing (lock) by the fixing member FI has been released.

The lock portion RO of the fixing member FI includes the hook HK and a projection JM as illustrated. Although the hook HK engages with the lens frame GF (eyeglasses GS), which is the object, during fixing, that is, when the lock portion RO is at the first position, the engagement is released and fixing is released when the lock portion RO is at the second position. In this regard, the projection JM has an inclined surface in contact with or in proximity to the first portion 105n as a protruding surface. When the first portion 105n moves in the −D1 side, that is, the first portion 105n moves in the direction indicated by the arrow RR2 as described with reference to FIG. 6, the inclined surface is pushed to the first portion 105n, thus the projection JN and further the entire lock portion RO is pushed (flipped) upward (to the −D3 side), that is, in the direction indicated by the arrow RR3 as shown in the state ER3, and as a result, the engagement (lock) by the hook HK is released. As described above, in the above-described mode, the first portion 105n, which is a portion of the extension member 105 on the side closer to the support member 104, has a function of releasing the fixing by the fixing member FI with rotation. In addition, when the first portion 105n rotates, the second portion 105f, which is longer than the first portion 105n, is spread, and thus the engagement (lock) can be reliably released with small force by the principle of leverage.

Further, to lock again in the state as shown in the state DR3 of FIG. 6, the user may push down the lock portion RO from the upper side to the lower side using his or her finger or the like to set the lock portion in a state as shown in the state DR1.

In this embodiment also, the head-mounted display apparatus can be easily and reliably positioned (leaned) with respect to the eyeglasses GS, and thus can be comfortably put on or taken off even when the eyeglasses GS are worn. In addition, in this embodiment, fixing and releasing can be easily performed due to the fixing member FI.

Third Embodiment

An example of a head-mounted display apparatus 100 according to a third embodiment will be described with reference to FIG. 8 below.

Figure 8:
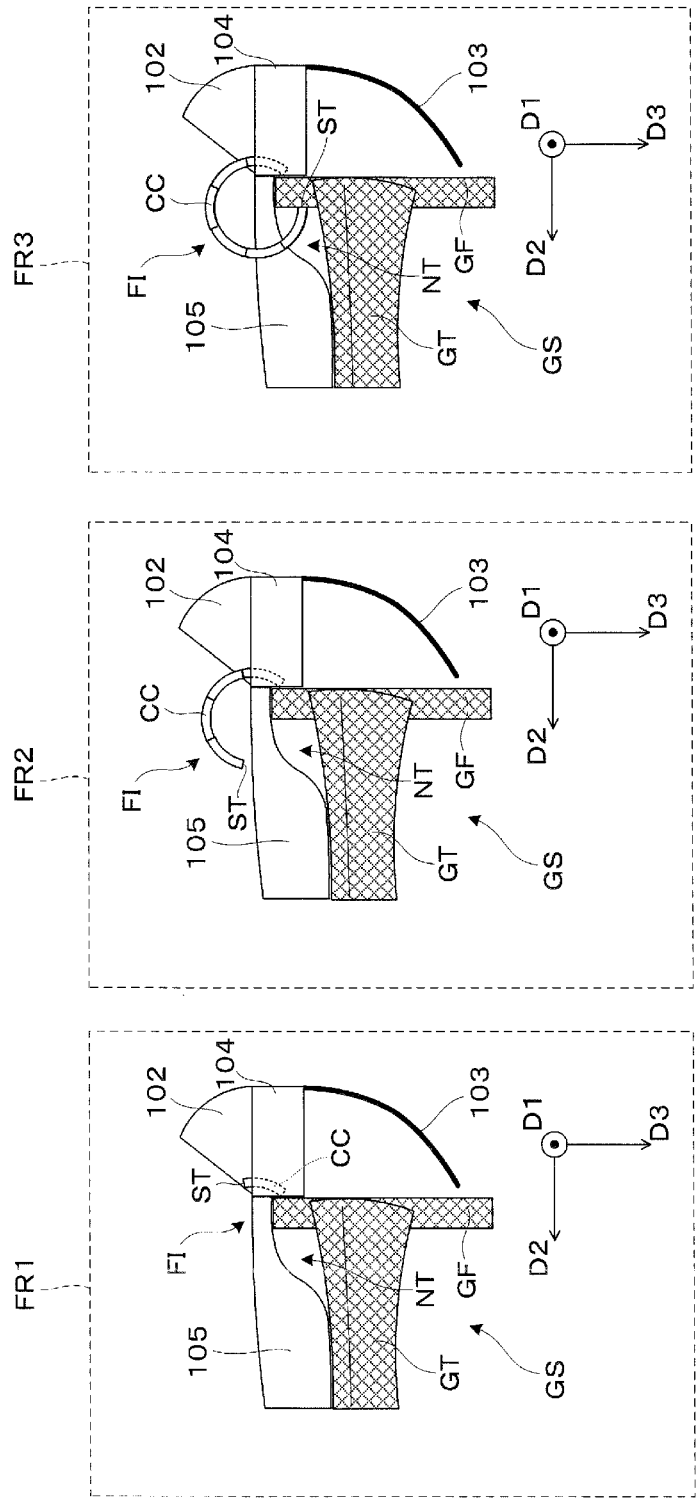
FIG. 8 includes conceptual side views for describing a head-mounted display apparatus according to a third embodiment.

Although the head-mounted display apparatus 100 according to this embodiment is in common with that of the second embodiment in that the fixing member FI and the support member 104 cooperate to fix (position) the lens frame GF (eyeglasses GS), the fixing member FI has a different structure from that of the second embodiment as illustrated in FIG. 8. Further, because the head-mounted display apparatus 100 is similar to that of the second embodiment except for the above-mentioned configurations, description of the entire overview thereof is omitted.

FIG. 8 includes conceptual side views for describing the head-mounted display apparatus 100 according to this embodiment, which are views corresponding to the view shown as the state BR1 of FIG. 4, and the like, for example. The head-mounted display apparatus 100 of this embodiment includes a fixing member FI provided on a support member 104, as in FIG. 8 showing change states as the state FR1 to the state FR3. The fixing member FI clamps a lens frame GF (eyeglasses GS) as an object to fix, that is, position (lock), it as a tip portion ST reaches a position facing a part of a first coupled portion CP1 of the support member 104 as shown in the state FR3 when a circular ring-shaped member CC extends while rotating in the D1 direction (first direction) as the axial direction of the rotational axis. Further, in this case, the fixing is released when the circular ring-shaped member CC shifts from the state FR3 to the state FR1. In this embodiment, since the fixing member FI includes the circular ring-shaped member CC that is provided on the support member 104 and advances and recedes while rotating in the D1 direction as the axial direction of the rotational axis as described above, the fixing and releasing can be easily performed. Further, the circular ring-shaped member CC that advances and recedes can have a variety of configurations, and for example, a configuration that enables the above-described operation is conceivable by preparing a plurality of members having a shape obtained by cutting out a portion of a circular ring, as illustrated, and linking the members to be slidable and fixed in a predetermined posture. In addition, without being limited to the circular ring-shaped member CC, and a similar configuration can be achieved in various shapes.

Fourth Embodiment

An example of a head-mounted display apparatus 100 according to a fourth embodiment will be described with reference to FIG. 9 below.

Figure 9:
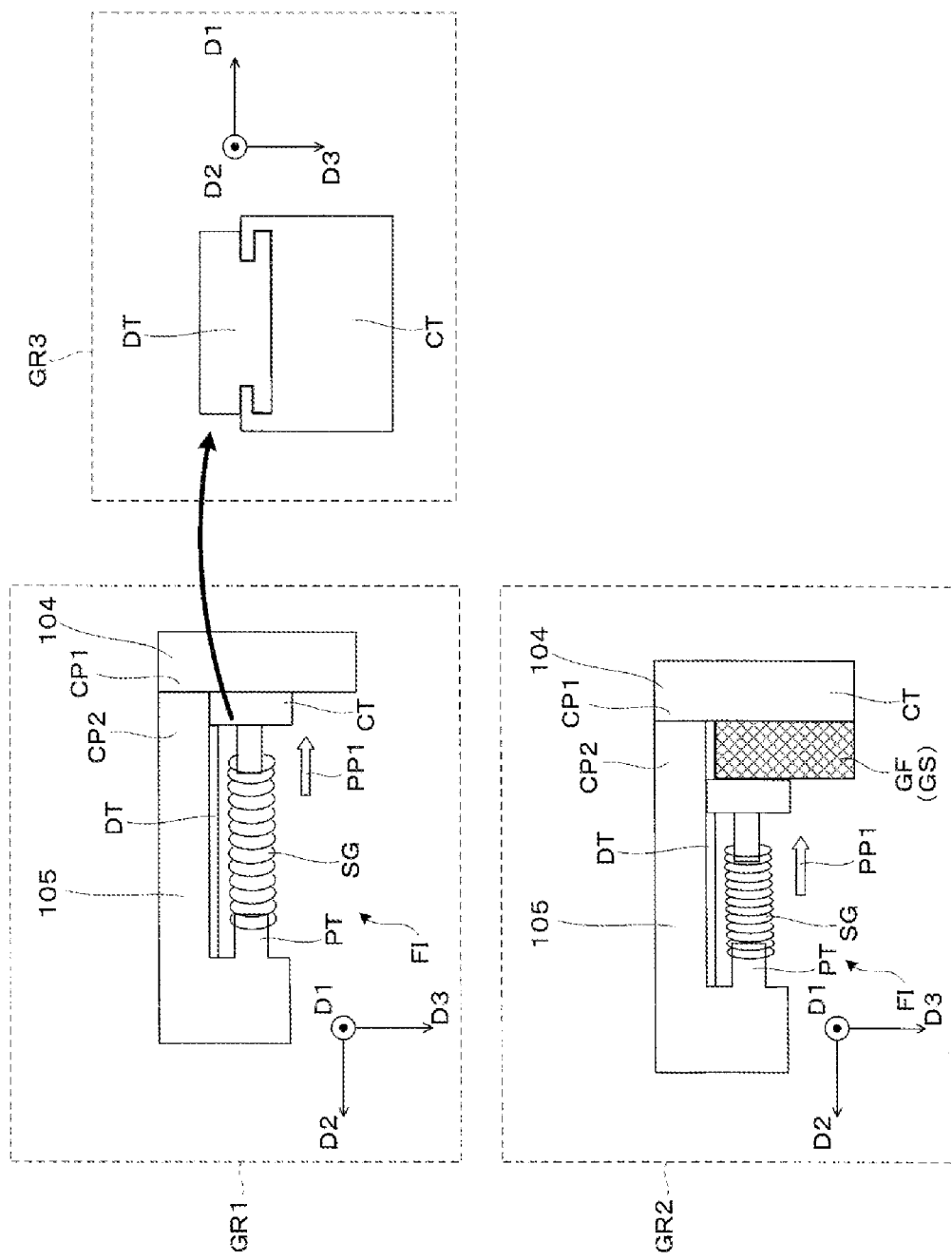
FIG. 9 includes conceptual views for describing a head-mounted display apparatus according to a fourth embodiment.

Although the head-mounted display apparatus 100 according to this embodiment is in common with that of the second embodiment in that the fixing member FI and the support member 104 cooperate to fix (position) the lens frame GF (eyeglasses GS), the fixing member FI has a different structure from that of the second embodiment as illustrated in FIG. 9. Further, because the head-mounted display apparatus 100 is similar to that of the second embodiment except for the above-mentioned configurations, description of the entire overview thereof is omitted.

FIG. 9 includes conceptual views for describing the head-mounted display apparatus 100 according to this embodiment, specifically illustrating a coupling point of the support member 104 and the extension member 105, and a state of attachment of eyeglasses GS to the coupling point and the surroundings. Specifically, in FIG. 9, whereas the state GR1 is a conceptual side view illustrating a state in which there is no lens frame GF (eyeglasses GS), and the state GR2 is a conceptual side view illustrating a state in which the lens frame GF (eyeglasses GS) is present, and in particular, a state in which the fixing member FI is at the first position and fixing (lock) by the fixing member FI has been performed. Further, the state GR3 is a conceptual cross-sectional view for describing a groove (guide groove) DT constituting the fixing member FI.

First, the head-mounted display apparatus 100 of this embodiment includes the fixing member FI provided on an extension member 105 as shown in the state GR1. The fixing member FI includes an elastic member SG that expands and contracts in the D2 direction (second direction), a contact portion CT that is provided at a tip of the elastic member SG and comes in contact with the lens frame GF (eyeglasses GS) when the lens frame GF as an object is present, and the groove (guide groove) DT formed in the D2 direction.

The elastic member SG is composed of, for example, a helical spring, or the like, one end of the elastic member SG is attached to a projection PT provided on the +D2 side of the extension member 105, and the other end (tip) is attached to the contact portion CT as described above.

The contact portion CT is provided on the −D2 side, is attached to a tip of the elastic member SG on the +D2 side, and is slidably movable along the groove DT, that is, in the D2 direction when it engages with the groove DT on the +D3 side as shown in the state GR3. In the configuration described above, the contact portion CT comes into contact with the lens frame GF (eyeglasses GS) when it is at the first position due to a biasing force of the elastic member SG as shown in the state GR2, and is pressed to the −D2 side, that is, in the direction indicated by the arrow PP1. As described above, the contact portion CT cooperates with the support member 104 to position (fix) the lens frame GF (eyeglasses GS), that is, the fixing member FI locks. Further, the fixing is released (unlocked) when the user moves the contact portion CT in the +D2 direction with his or her finger or the like. Also in this embodiment, fixing and releasing can be easily performed due to the fixing member FI.

MODIFIED EXAMPLES AND OTHERS

Although this disclosure has been described based on the above-described embodiments, this disclosure is not limited to the above-described embodiments, may be carried out in various modes without departing from the gist of this disclosure, and, for example, may be modified as follows.

The optical system or the like incorporated into the first display unit 100A and the like can employ a variety of configurations. Specifically, a variety of configurations in which an off-axis optical system that has asymmetry in the light-guiding direction is formed or the number of lenses as optical elements is appropriately increased or reduced can be employed.

A light modulation device that modulates light by controlling transmitted light of the combiners 103a and 103b may be mounted on the outside of the combiners 103a and 103b. The light modulation device adjusts a transmittance, for example, electrically. Mirror liquid crystals, electronic shades, and the like may be used as the light modulation device. The light modulation device may adjust a transmittance according to a luminance of external light.

The combiners 103a and 103b can also be replaced with mirrors having light-shielding properties. In this case, the combiners are configured as a non-see-through optical system on the assumption that the external images are not directly observed.

The frame or the like constituting the support member 104 is not limited to being formed of a metal material or the like, and may be formed of, for example, a fiber-reinforced plastic (FRP).

In addition, the above-described embodiments may be combined as appropriate in the scope without contradiction. For example, the slip resistance member NS and the cushioning material CU described in the first embodiment may be provided at various locations, without being limited to the above-described locations. In addition, this configuration may be adopted in other embodiments as appropriate. Furthermore, the surface portion on which the slip resistance member NS and the cushioning material CU are provided may be configured to be a planar surface.

A first head-mounted display apparatus according to a specific mode includes a first display unit that displays an image, a second display unit that displays an image, a support member that supports the first display unit and the second display unit, an extension member extending in a second direction intersecting a first direction along the direction from the first display unit to the second display unit, and a coupling member coupling the support member to the extension member, in which the support member has a first coupled portion coupled to the extension member via the coupling member, the extension member has a second coupled portion coupled to the support member via the coupling member, and a width of the first coupled portion is wider than a width of the second coupled portion in a third direction intersecting the first direction and the second direction.

By making a difference in the widths on the support member side (first coupled portion) supporting each of the display units and on the extension member side (second coupled portion) in the head-mounted display apparatus, the head-mounted display apparatus can be easily and reliably positioned (leaned) with respect to eyeglasses, and thus can be comfortably put on or taken off even when the eyeglasses are worn.

In a specific aspect, the support member supports the first display unit and the second display unit on one side in the third direction. In this case, each display unit is supported to enable the user to visually recognize displayed images.

In a specific aspect, the first coupled portion includes a cushioning material. In this case, the lenses of eyeglasses can be prevented from being damaged or the like, for example, when the head-mounted display apparatus is used while the eyeglasses are being worn.

In a specific aspect, for a first region of the extension member occupying one side thereof including the second coupled portion and a second region occupying the other side thereof not including the second coupled portion, a width of the first region in the third direction is narrower than a width of the second region in the third direction. In this case, a notch can be formed in the vicinity of the second coupled portion. The notch makes it possible for the head-mounted display apparatus to be positioned (leaned) with respect to eyeglasses while avoiding them when the apparatus is put on or taken off even if the eyeglasses are worn.

In a specific aspect, the extension member includes a slip resistance member on one side of the first region in the third direction. In this case, misalignment of the head-mounted display apparatus with respect to eyeglasses can be curbed.

In a specific aspect, a fixing member that fixes an object in cooperation with the support member is provided. In this case, the fixing member is intended to further curb misalignment.

In a specific aspect, the fixing member has a lock portion facing a part of the first coupled portion of the support member when fixing the object. In this case, lock-fixing is possible at the lock portion.

In a specific aspect, the extension member is rotatable with the third direction as the axial direction of a rotational axis with reference to the coupling member, and a length of a portion of the extension member in the second direction on the side closer to the support member with reference to the coupling member is shorter than a length of a portion thereof in the second direction on the side farther from the support member. In this case, the fixing can be released by using the extension member, and at this time, it is possible to reliably release the fixing with a small force.

In a specific aspect, a portion of the extension member on the side closer to the support member, along with rotation thereof, releases fixing by the fixing member. In this case, it is possible to release the fixing made by using the portion of the extension member closer to the support member.

In a specific aspect, the fixing member is provided on the support member, and rotates with the first direction as the axial direction of a rotational axis. In this case, the fixing member that advances and recedes while rotating is provided in the support member to be able to perform fixing and releasing thereof.

In a specific aspect, the fixing member includes an elastic member provided in the extension member and expands and contracts in the second direction, and a contact portion provided at one end of the elastic member. In this case, by causing the contact portion to come into contact with a portion that is supposed to be an object using expansion or contraction of the elastic member, fixing and releasing thereof can be performed.

In a specific aspect, the extension member has a groove formed in the second direction, and the contact portion engages into the groove. In this case, the contact portion can be moved along the groove.

A second head-mounted display apparatus according to a specific aspect includes a display unit that displays an image, a support member that extends in a first direction and supports the display unit, an extension member extending in a second direction intersecting the first direction, and a coupling member coupling the support member to the extension member, in which the support member has a first coupled portion coupled to the extension member via the coupling member, the extension member has a second coupled portion coupled to the support member via the coupling member, and a width of the first coupled portion is wider than a width of the second coupled portion in a third direction intersecting the first direction and the second direction.

A third head-mounted display apparatus in a specific aspect includes a display unit that displays an image, a support member that supports the display unit, and an extension member that extends from the support member and has a notch on a side coupled to the support member.

What is claimed is:
1. A head-mounted display apparatus comprising:
a first display unit configured to display an image;
a second display unit configured to display the image;
a support member configured to support the first display unit and the second display unit;
an extension member extending in a second direction intersecting a first direction along a direction from the first display unit to the second display unit; and
a coupling member coupling the support member to the extension member, wherein
the support member includes a first coupled portion coupled to the extension member via the coupling member,
the extension member includes a second coupled portion coupled to the support member via the coupling member, and
a width of the first coupled portion is wider than a width of the second coupled portion in a third direction intersecting the first direction and the second direction, wherein
for a first region of the extension member occupying one side of the extension member including the second coupled portion and a second region occupying the other side of the extension member not including the second coupled portion, a width of the first region in the third direction is narrower than a width of the second region in the third direction, wherein
the extension member includes a slip resistance member on one side of the first region in the third direction.
2. The head-mounted display apparatus according to claim 1, wherein
the support member supports the first display unit and the second display unit on one side in the third direction.
3. The head-mounted display apparatus according to claim 1, wherein
the first coupled portion includes a cushioning material.
4. The head-mounted display apparatus according to claim 1, further comprising:
a fixing member configured to cooperate with the support member to fix an object.
5. The head-mounted display apparatus according to claim 4, wherein
the fixing member includes a lock portion facing a part of the first coupled portion of the support member when fixing the object.
6. The head-mounted display apparatus according to claim 4, wherein
the extension member is rotatable with the third direction as an axial direction of a rotational axis with reference to the coupling member, and
a length of a portion of the extension member in the second direction on a side closer to the support member with reference to the coupling member is shorter than a length of a portion of the extension member in the second direction on a side farther from the support member.
7. The head-mounted display apparatus according to claim 6, wherein
the portion of the extension member on the side closer to the support member, along with rotation thereof, releases fixing by the fixing member.
8. The head-mounted display apparatus according to claim 4, wherein
the fixing member is provided at the support member, and rotates with the first direction as an axial direction of a rotational axis.
9. The head-mounted display apparatus according to claim 4, wherein
the fixing member includes an elastic member that is provided at the extension member and is configured to expand and contract in the second direction, and a contact portion provided at one end of the elastic member.

10. The head-mounted display apparatus according to claim 9, wherein
the extension member includes a groove formed in the second direction, and
the contact portion engages into the groove.

11. A head-mounted display apparatus comprising:
a display unit configured to display an image;
a support member extending in a first direction and configured to support the display unit;
an extension member extending in a second direction intersecting the first direction; and
a coupling member coupling the support member to the extension member, wherein
the support member includes a first coupled portion coupled to the extension member via the coupling member,
the extension member includes a second coupled portion coupled to the support member via the coupling member, and
a width of the first coupled portion is wider than a width of the second coupled portion in a third direction intersecting the first direction and the second direction, wherein
for a first region of the extension member occupying one side of the extension member including the second coupled portion and a second region occupying the other side of the extension member not including the second coupled portion, a width of the first region in the third direction is narrower than a width of the second region in the third direction, wherein
the extension member includes a slip resistance member on one side of the first region in the third direction.

* * * * *